(12) United States Patent
Perdue et al.

(10) Patent No.: US 12,086,745 B2
(45) Date of Patent: Sep. 10, 2024

(54) FACILITY ANALYTICS

(71) Applicant: Datakwip Holdings, LLC, Frederick, MD (US)

(72) Inventors: Cory Scott Perdue, Frederick, MD (US); Brett Matthew Boyer, Frederick, MD (US)

(73) Assignee: Datakwip Holdings, LLC, Frederick, MD (US)

(*) Notice: Subject to any disclaimer, the term of this patent is extended or adjusted under 35 U.S.C. 154(b) by 0 days.

(21) Appl. No.: 17/707,276

(22) Filed: Mar. 29, 2022

(65) Prior Publication Data

US 2022/0261728 A1    Aug. 18, 2022

Related U.S. Application Data

(63) Continuation of application No. 16/833,632, filed on Mar. 29, 2020, now Pat. No. 11,295,255.

(Continued)

(51) Int. Cl.
| | |
|---|---|
| *G06Q 10/0631* | (2023.01) |
| *G06F 17/18* | (2006.01) |
| *G06Q 50/06* | (2024.01) |
| *G16Y 10/80* | (2020.01) |
| *G16Y 20/10* | (2020.01) |
| *G16Y 20/30* | (2020.01) |

(Continued)

(52) U.S. Cl.
CPC ....... *G06Q 10/06315* (2013.01); *G06F 17/18* (2013.01); *G06Q 10/06312* (2013.01); *G16Y 10/80* (2020.01); *G16Y 20/10* (2020.01); *G16Y 20/30* (2020.01); *G16Y 40/10* (2020.01); *G16Y 40/35* (2020.01); *G06Q 50/06* (2013.01)

(58) Field of Classification Search
CPC .............. G06F 17/18; G06Q 10/06312; G06Q 10/06315; G06Q 50/06; G16Y 10/80; G16Y 20/10; G16Y 20/30; G16Y 40/10; G16Y 40/35; G05B 15/02; G05B 2219/2639; G05B 2219/2642
See application file for complete search history.

(56) References Cited

U.S. PATENT DOCUMENTS

| | | | |
|---|---|---|---|
| 2012/0096290 A1* | 4/2012 | Shkolnikov | G06F 1/325 713/320 |
| 2012/0323382 A1* | 12/2012 | Kamel | G06Q 50/06 700/286 |

(Continued)

*Primary Examiner* — Jason D Recek
(74) *Attorney, Agent, or Firm* — Leveque Intellectual Property Law, P.C.

(57) ABSTRACT

A network edge device includes a local network interface, a remote network interface, a memory and a processor. The local network interface receives data from local data sources over a local network. The remote network interface communicates with a remote computer over a remote network. The processor receives a filter parameter set for each local data source from the remote computer. Each filter parameter set includes a data rate parameter and at least one of a minimum threshold parameter, a maximum threshold parameter or a change-of-value (COV) parameter. For each local data source, the processor compare each data value received from the local data source to at least one of the filter parameters, and sends the data value and subsequent data values to the remote computer at a data rate that is based on the data rate parameter.

14 Claims, 12 Drawing Sheets

Related U.S. Application Data

(60) Provisional application No. 62/928,595, filed on Oct. 31, 2019, provisional application No. 62/826,186, filed on Mar. 29, 2019.

(51) Int. Cl.
*G16Y 40/10* (2020.01)
*G16Y 40/35* (2020.01)

(56) References Cited

U.S. PATENT DOCUMENTS

| | | | |
|---|---|---|---|
| 2014/0122729 A1* | 5/2014 | Hon | H04N 1/00244 |
| | | | 709/228 |
| 2016/0210569 A1* | 7/2016 | Enck | G06Q 10/0637 |
| 2017/0082993 A1* | 3/2017 | Narain | H04W 4/33 |

* cited by examiner

| Alerts | | | | | | | | |
|---|---|---|---|---|---|---|---|---|
| | 910 | 911 | 912 | 913 | 914 | 915 | 916 | 917 Aggregate |
| Alert Name | Equip Name | Point Name | Start Date | End Date | kWh Wasted | Consumption Cost | Max kW | Demand Cost | Projected Annual Cost |
| 930 AHU Early Start | AHU 7 East | Fan Status | 2020-03-25 06:15 am | 2020-03-25 08:00 am | 21.13 | $2.92 | 918 11.19 | 919 $40.57 | $1066.51 |
| 931 AHU Early Start | AHU 3 | Fan Status | 2020-03-25 06:30 am | 2020-03-25 08:00 am | 15.15 | $2.09 | 8.91 | $32.30 | $764.51 |
| 932 AHU Early Start | AHU 5 East | Fan Status | 2020-03-25 06:30 am | 2020-03-25 08:00 am | 14.96 | $2.07 | 8.70 | $31.54 | $755.17 |
| 933 AHU Early Start | AHU 2 | Fan Status | 2020-03-25 07:30 am | 2020-03-25 08:00 am | 6.39 | $0.88 | 8.62 | $31.25 | $322.31 |
| 934 AHU Early Start | AHU 10 West | SF-S | 2020-03-25 07:30 am | 2020-03-25 08:00 am | 4.32 | $0.60 | 5.84 | $21.17 | $218.20 |
| 935 AHU Early Start | AHU 11 West | SF-S2 | 2020-03-25 07:15 am | 2020-03-25 08:00 am | 0.00 | $0.00 | 0.00 | $0.00 | $0.00 |
| 920 | 921 | 922 | 923 | 924 | 925 | 926 | 927 | 928 | 929 |

FACILITY ANALYTICS

CROSS-REFERENCE TO RELATED APPLICATIONS

This application claims priority to U.S. patent application Ser. No. 16/833,632 (filed on Mar. 29, 2020, issued as U.S. Pat. No. 11,295,255), which claims the benefit of U.S. Provisional Patent Application Ser. No. 62/826,186 (filed on Mar. 29, 2019) and 62/928,595 (filed on Oct. 31, 2019), the contents of which are hereby incorporated herein by reference in their entireties.

BACKGROUND

The present disclosure relates to computer systems. More particularly, the present disclosure relates to computer systems for facility analytics.

Data from a facility (e.g., an office building, a school, a hospital, a data center, a residential building, an industrial building, a government building, a telecommunications center, and the like) may be gathered through a variety of techniques. By way of example, such data may include energy use and consumption, operating costs and parameters, performance data, environmental condition data, equipment use and efficiency, maintenance data, fault or failure information, evaluation data related to equipment or systems, utility data, control system data, temporal data, communications-related data, measurements or sensor data, security-related data, and so forth. However, this data may be difficult to gather and interpret, and thus the existing uses of this data may be insufficient relative to the potential uses that may exist. There remains a need for improved devices, systems, and methods for facility analytics.

BRIEF DESCRIPTION OF THE DRAWINGS

FIGS. 9A and 9B illustrate two graphical user interfaces, in accordance with embodiments of the present disclosure.

DETAILED DESCRIPTION

Figure 1:
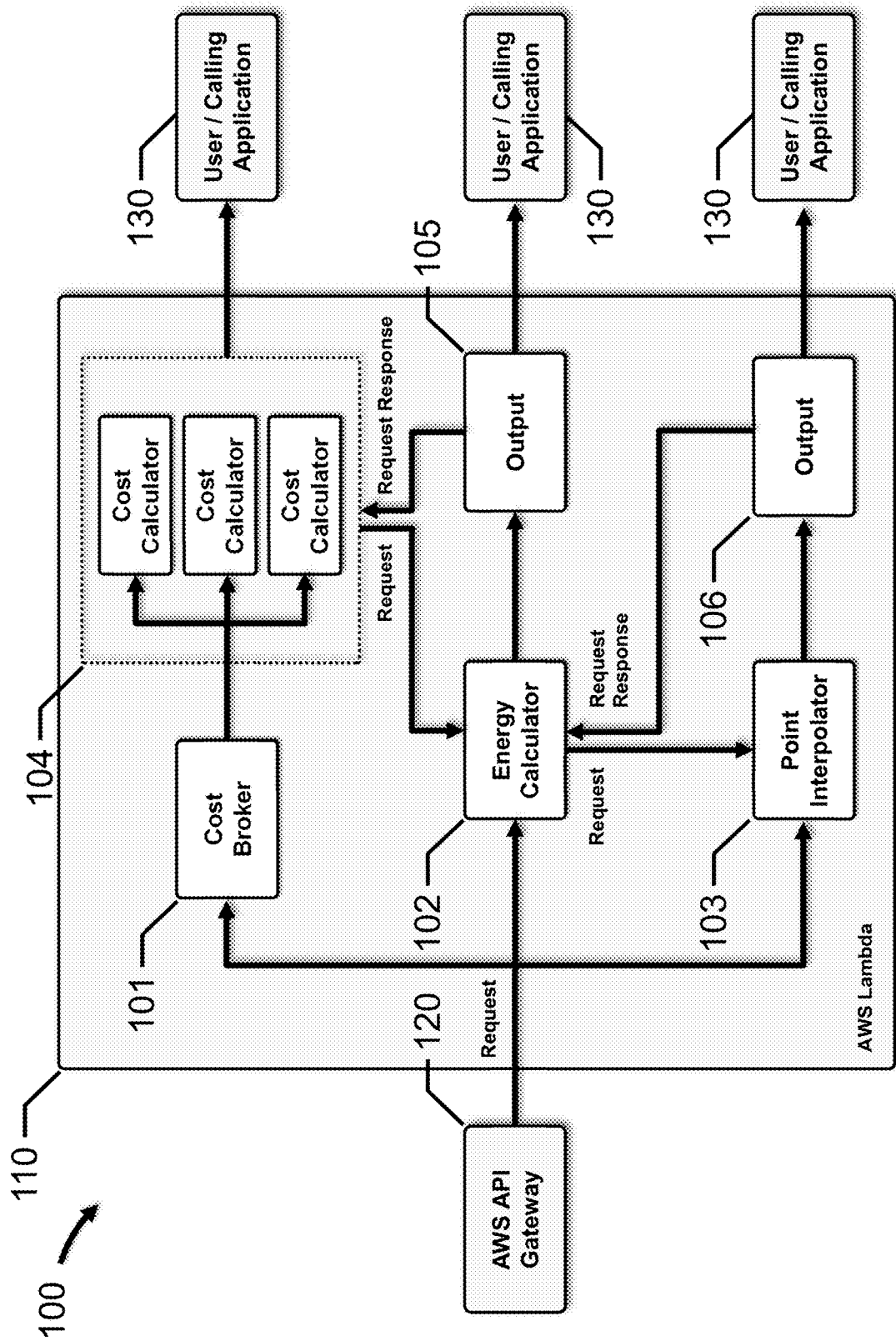
FIG. 1 illustrates a data flow diagram for a real-time point cost and energy calculator, in accordance with an embodiment of the present disclosure.

Embodiments of the present disclosure will now be described with reference to the drawing figures, in which like reference numerals refer to like parts throughout.

In general, the inventive devices, systems, and methods described herein advantageously gather, store, display, organize, analyze, formulate, and/or use facility data.

In one embodiment, a computer-based method for tagging building automation system (BAS) points for a building includes receiving, from a BAS or other data source over a network, static data for a plurality of electrical energy-consuming equipment (EECE) associated with the building, the static data including one or more performance attributes for each EECE; receiving, from the BAS or a network edge device over the network, dynamic data for each EECE, the dynamic data including measured performance data for each EECE over a predetermined time period; determining a BAS point for each EECE based on the static data and the dynamic data, each BAS point having a plurality of attributes including a unique identifier (ID), a semantic label, and one or more measured performance values. For each BAS point, generating one or more common tags based on the unique ID and the semantic label, generating one or more additional tags based on the measured performance values, and generating a tag list based on the common tags and the additional tags. And, generating a tagged point database based on the tag list for each BAS point.

As used herein, a "facility" may generally include one or more physical spaces or volumes. Such a facility may be substantially closed to an external environment (e.g., a building), partially closed to an external environment (an indoor/outdoor area), fully open to an external environment (e.g., an outdoor space), or any combination thereof. By way of example, a facility may include one or more of an office building or commercial space, a school, a hospital, a data center, a residential building (e.g., a high-rise apartment building), a hotel, an industrial building (e.g., a factory), a government building, a telecommunications center (e.g., a data center), a restaurant, a group of buildings (interconnected or otherwise), and the like.

As used herein, "data" may generally include information related to a facility, e.g., information related to its equipment, systems, spaces, utilities, resources, personnel, and so on. By way of example, data may include information related to energy use and consumption, operating costs and parameters, performance data, environmental condition data (e.g., temperature, humidity or other moisture level information, air quality, pressure, and so on), equipment use and efficiency, maintenance data, fault or failure information, evaluation data related to equipment or systems, utility data, control system data, temporal data, communications-related data, force measurements or other sensor data, security-related data, facility-use information, and the like. In certain instances, a facility may contain so much data (and relationships within data points) that a human cannot possibly evaluate all of this information to identify useful insight or conclusions, but embodiments of the present disclosure facilitates the effective use(s) of this data—e.g., identifying savings opportunities, taking corrective actions, and so on. By way of example, a cloud-based portal may provide one or more user-customizable dashboards and reports to prioritize savings opportunities, thereby eliminating time wasted trying to find issues.

Embodiments of the present disclosure advantageously provide a platform and system for viewing, studying, analyzing, and manipulating facility data. By way of further example, embodiments of the present disclosure may be used for increasing efficiency and managing energy consumption, addressing anomalies, developing operating parameters or best practices, decreasing cost(s), and so forth. To this end, some of the features of the present disclosure include energy savings and rebate automation, real-time reporting, managed alerts, rules-based analytics, predictive maintenance, and machine learning. Some of these features and potential advantages thereof are discussed below.

Energy Savings and Rebate Automation

Waste is an unfortunate, yet constant fact of life. While some degree of waste may be unavoidable, there may be ways to minimize some waste, e.g., using embodiments of the present disclosure. For example, generally, when there is an awareness that waste is occurring, it may be mitigated, minimized, or eliminated. Embodiments of the present disclosure use artificially intelligent machine-learning algorithms, in combination with a cloud-based, streaming platform that monitors a facility in real-time or near real-time, e.g., analyzing thousands of points and tens of thousands of relationships between points to discover/identify opportunities to eliminate waste.

Similar to automating an energy management process, embodiments of the present disclosure include an automated rebate process to enable securing utility rebates as effortless as possible for users. For example, embodiments of the present disclosure work directly with utility providers to auto-generate records that may qualify for rebate distributions.

Real-Time Reporting

Because most heating, ventilation, and air conditioning (HVAC) equipment is energy intensive, if this equipment is malfunctioning or otherwise performing inefficiently in a facility, information related thereto may be salient to, e.g., avoiding unnecessary energy waste, tenant complaints, and damage to equipment. In many facilities, such insight is gained via site walks, an alarm (e.g., one alarm in a list of hundreds of nuisance alarms in an energy management system), or when a user notices a spike in a utility bill. Thus, when something goes awry with such HVAC equipment that will adversely affect operations of a facility, this usually leads to lost time and money.

However, embodiments of the present disclosure include a streaming energy analytics platform that provides real-time reporting, a user may receive information related to a fault in a system or piece of equipment relatively quickly (or even immediately). Embodiments of the present disclosure thus provide information regarding the efficiency of equipment operations, which may be scored by energy use, cost-per-point-operating, or in relation to downstream equipment that will save a user time and frustration.

Managed Alerts

Consider the long email chains that can arise from a single comfort complaint. To avoid this and other related issues, embodiments of the present disclosure optimize a facility's performance, e.g., to identify and correct issues before complaints are made. For example, using managed alerts, there may be no deluge of emails/complaints, just information that is useful to fix any issues. That is, when it comes to facility maintenance, it is usually important that the correct information is directed to the appropriate personnel or system, and not everyone in a facility. With managed alerts, embodiments of the present disclosure allow a user to customize notifications when an issue is identified. For example, embodiments of the present disclosure allow for the setting of thresholds and the routing of notifications, e.g., to ensure the right people receive them based on factors such as facility location, staff scheduling, and issue severity.

Rules-Based Analytics

The cost of operating a facility may be unavoidable, but users may attempt to keep costs down by, e.g., closing doors and windows, keeping thermostats set at a certain setpoint, and using energy efficient tools and products. Further, a facility may contain a plethora of data that can help offset some operating costs, but this data may include numbers that do not mean anything to facility personnel. However, embodiments of the present disclosure access this data, which can be a goldmine of knowledge that can help a user save on relatively significant expenses. Specifically, embodiments of the present disclosure utilize analytics including mathematical calculations used to calculate reports and alerts, and algorithms that produce actionable results.

Predictive Maintenance

Although equipment failure may be inevitable, it does not mean that it should be unpredictable. Embodiments of the present disclosure include predictive maintenance that can provide efficiency insights from install to downfall, and every step in-between, so a user can get the most out of a facility's monitored equipment.

A machine learning platform may learn how equipment operates, thus providing a clear understanding of what is optimal for a system. For example, this understanding can provide insight to inform a user about the time that is remaining before recommending repairing or replacing monitored equipment.

By way of example, a supply fan belt in a user's third floor air handling unit may be monitored to provide insight based on what air movement (e.g., in cubic feet per minute, or CFM) the unit was designed to put out given its operating parameters. In this manner, if the system determines the duct static pressure is declining over time at those same parameters, the system can flag this condition to notify staff that it may be time to check that belt.

In this manner, by providing a user with the information needed to effectively maintain a facility, a user should not have to be concerned about unanticipated downtime due to an unforeseen maintenance issue, and repair and replacement can be scheduled to ensure minimal loss of service. Thus, embodiments of the present disclosure enable users to proactively manage a facility's core operational assets to maximize their useful lifespan in a manageable and scalable way.

Machine Learning

There are usually patterns in just about everything a facility does. For example, the heat load in a conference room may increase every day between 11 a.m. and 2 p.m. because of the sun; the lights in an office may turn on at 7:55 every morning and go off again at 6:45 every afternoon; and so on. Embodiments of the present disclosure provide tools that utilize machine learning energy analytics to monitor a facility—e.g., from the lighting control schedule in an office, to an air-handling unit's (AHU) supply duct static pressure, to floor variable air volume (VAV) damper positions, and everything in-between. Embodiments of the present disclosure include a system that uses all of the data generated by an energy management system (e.g., an existing, third-party energy management system), analyzes the data, and provides insight to optimize operations accordingly. For example, the system may identify inefficiencies or savings opportunities that traditional rules-based analytics can miss.

Thus, in certain implementations, machine learning algorithms learn what a facility's maximum efficiency potential is, and uses that information to decrease operating expenses while maximizing a maintenance workflow process.

Some of the resources included in, or utilized by, embodiments of the present disclosure are discussed below.

Connectivity

Analytics may start with raw data. Embodiments of the present disclosure thus include an analytics platform that is configured to import any and all available data from a client's system, e.g., a client's existing systems. These data may include static files, existing databases, streaming data, and live data from an existing energy management system. Embodiments of the present disclosure include an ingestion pipeline that does not discriminate, but rather the pipeline facilitates receiving any type of data, e.g., to store it immediately for backup in a secure data storage facility, which can be a third-party server or database.

Data Enrichment

After importing static data, establishing a connection to a database, or establishing a persistent connection to a live data stream like an energy management system, embodiments of the present disclosure separate out each piece of information and pass it through a data enrichment layer. Data enrichment may include the act of taking raw data and adding additional knowledge—this converts the data into more useful and contextualized information. For example, because of such data enrichment, an update from a temperature sensor is not just a number, but rather it is an update from a sensor in a specific room or area or building, which may have its own characteristics such as a specific location and occupancy (e.g., a room is served by an air handler, say AHU-2, which is in turn served by a chiller). The ability to add knowledge to data enable embodiments of the present disclosure to generate valuable insights that become actionable later in the pipeline.

Scalable Service Queue

A facility may have a lot of data and embodiments of the present disclosure cloud platform may have the power to grow with a facility. To this end, embodiments of the present disclosure include a scalable service queue that grows dynamically with the data it receives. This means a system can focus on the value data can bring, not increasing costs or maintenance needed by a platform.

By using a scalable service queue, embodiments of the present disclosure may have the ability to continually develop new services that find new ways to deliver unharvested value back to users. This is where features like a real-time machine learning pipeline, a real-time rules engine, and a real-time alerting engine may get their fuel.

Further to the discussion above, machine learning generally represents a major paradigm shift in the way data is analyzed. That is, machine learning can shift operational work flows from a reactive to a proactive mode. To this end, embodiments of the present disclosure include machine-learning algorithms configured to utilize a facility's existing data to define a proper operation for the facility. Embodiments of the present disclosure compare new, real-time data to these established baselines and determine how a facility is operating relative to the best version of itself.

Collected data has to go somewhere, and it can be helpful if that location is scalable and flexible. Embodiments of the present disclosure include a data lake that stores data coming into the platform and information coming out of the platform (e.g., all data coming into, and information going out of, the platform). The data lake may store this data/information in a manner that makes it completely searchable to provide information needed today as well as answers to future questions.

Driven by the power and flexibility of the aforementioned data lake, embodiments of the present disclosure provide a visual analytics platform to present any information in any way. This means that customized visuals are possible, e.g., for particular clients or users, based on what visualizations work best for their organization. The visual analytics may be available anywhere, anytime, and accessible through any web browser, so a user can control how the information is used and shared throughout an organization or facility.

Embodiments of the present disclosure advantageously provide, inter alia, a real-time point cost and energy calculator, an edge hardware gateway, a facility/building designer, an automated point mapping pipeline, and a scalable and pluggable intelligence based on tags or the like, described in more detail below.

FIG. 1 illustrates a data flow diagram 100 for a real-time point cost and energy calculator 110, in accordance with an embodiment of the present disclosure.

Real-time point cost and energy calculator 110 includes cost broker module 101, energy calculator module 102, point interpolator module 103, one or more cost calculators 104, output module 105 and output module 106. Real-time point cost and energy calculator 110 receives a request from an Amazon Web Service (AWS) application programming interface (API) gateway 120, as described below, and outputs data to one or more user/calling applications 130.

Embodiments of the present disclosure advantageously provide a method of calculating an estimate of the energy consumed and a cost of equipment in real-time without a need to be connected to an on-site meter. Embodiments estimate point-level energy and cost by collecting data from a building automation system (BAS), e.g., where data solely from the BAS may be used in certain implementations. This may include four phases as described below.

During phase 1, a user may request the information and set filters regarding certain pieces of equipment or points that the user wants to include based on certain factors such as time-range, site, tags, and so on. This may be done via a representational state transfer (REST) API, where the filters are provided by request body parameters.

For example, AWS API gateway 120 may receive this information from one of the user/calling applications 130, and then create and send a request to real-time point cost and energy calculator 110.

During phase 2, for all of the filtered points that consume energy or have an associated cost, the BAS data may be used to determine whether or not a particular point was consuming energy, and if so, how much. These points may include commands/enables, statuses, frequencies, lockouts, and speeds. This allows embodiments of the present disclosure to determine (in real-time and historically) which points/equipment were running, and when, and with enhanced frequency and speed, how hard the points/equipment were running.

For example, energy calculator module 102 may use the BAS data to determine whether or not a particular point was consuming energy. Energy calculator module 102 may also send a request to point interpolator module 103 to take the requested points and interpolate their values based on the date range and the interval specified by the user. Point interpolator module 103 then provides these data to output module 106, which may output all of the requested points' values interpolated between the date range and the specified interval to energy calculator module 102 as well as user/calling application 130, if requested. Additionally, point interpolator module 103 may also review the BAS data to determine an overall trend, and then replace any outlier values, i.e., BAS data values that lie outside the trend, with interpolated values that are based on the non-outlier values in the BAS data.

During phase 3, the BAS data may be converted into kilowatt (kW) data in order to calculate the total kW from the filtered points that was demanded at each time-interval. For example, when onboarding a facility, the energy data for each energy-consuming point may be entered into the database. This data may have been collected during an onsite audit. Therefore, embodiments of the present disclosure know if a certain piece of equipment is running, and how much energy is being consumed. For pieces of equipment that consume energy based on load, a heating and cooling regression may be applied, e.g., based on outside air temperature to determine how hard the equipment was running.

For example, energy calculator module 102 may convert the BAS data into kW data, and calculate the total kW from the filtered points that was demanded at each time-interval. These data may be provided to output module 105, which may output these data to one or more cost calculators 104, as well as user/calling application 130, if requested.

During phase 4, the cost may then be calculated from the kW by using a site's rate schedule. For example, once the kW values in 15-minute intervals are determined, these values can be used to determine the total kWh used, max kW demand over an interval, the total cost of running selected equipment, the consumption cost of the kWh, and the potential demand cost of the max kW.

For example, cost broker module 101 determines the method of calculation for each site, which can have a different rate schedule. Cost broker module 101 then instructs one or more of the cost calculators 104 to calculate the cost from the kW by using a site's rate schedule. The cost calculator 104 may send a request to energy calculator module 102, which prompts output module 105 to provide a response to cost calculator 104 that includes the total kW for all including points in the date range.

Figure 2:
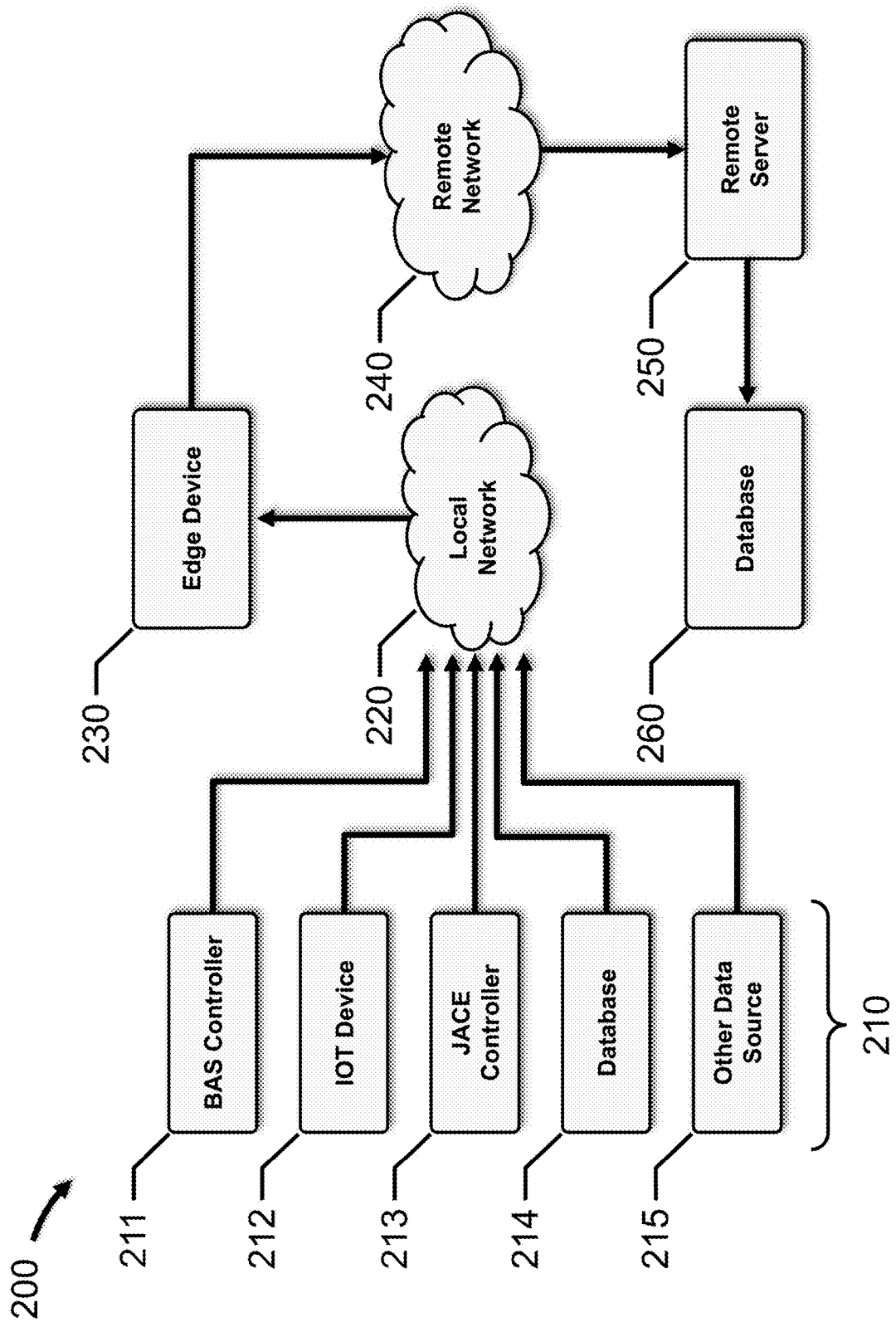
FIG. 2 illustrates a system block diagram depicting, inter alia, network edge device with local change of value (COV) tracking, in accordance with an embodiment of the present disclosure.

FIG. 2 illustrates a system block diagram 200 depicting, inter alia, network edge device 230 with local change of value (COV) tracking, in accordance with an embodiment of the present disclosure.

Data sources 210 include, for example, BAS controller 211, internet-of-things (IOT) device(s) 212, Java application control engine (JACE) controller 213, database 214 and other data source(s) 215. Data sources 210 are coupled to local network 220. Network edge device 230 is coupled to local network 210 and remote network 240, such as the Internet, etc. Remote server 250 is coupled to remote network 240 and database 260, and may execute an API listener program.

As described herein, network edge device 230 may send the value of a sensor whenever a predetermined time period elapses or when the value of the sensor changes by some designated delta.

Embodiments of the present disclosure advantageously include a method of monitoring data points of a building automation system. In one embodiment, local monitoring of real-time values may be performed by an appropriately-programmed on-site building control system, such as BAS 211, JACE controller 213, etc. In another embodiment, local monitoring of real-time values may be performed by network edge device 230. The monitoring system or network edge device 230 may only push data to remote server 250 when triggered. For example, network edge device 230 may be triggered once the real-time value of a data point has changed a specified, predetermined amount from the last trigger. If a data point has not reached this change of value after a specified period of time, the trigger may be tripped automatically. There may also be a minimum amount of time that must pass before a trigger can be tripped again. Once a trigger has been tripped for a specific data point, that real-time value of the data point may be pushed to remote server 250.

Network edge device 250 may monitor all data points coming from the real-time data source. For each point in the data source, network edge device 230 knows how much that point value can change until it causes a trigger. If the point crosses this change-of-value threshold, network edge device 230 sends the updated point value to remote server 250. Network edge device 230 may also, or instead, have a minimum and maximum time value for when data is sent. For example, if the point has not hit the change of value threshold and the maximum time has elapsed, the current value for that point may then be sent. If the value of the point is changing rapidly, network edge device 230 may wait at least a minimum amount of time before it can send the value for that point.

Figure 3:
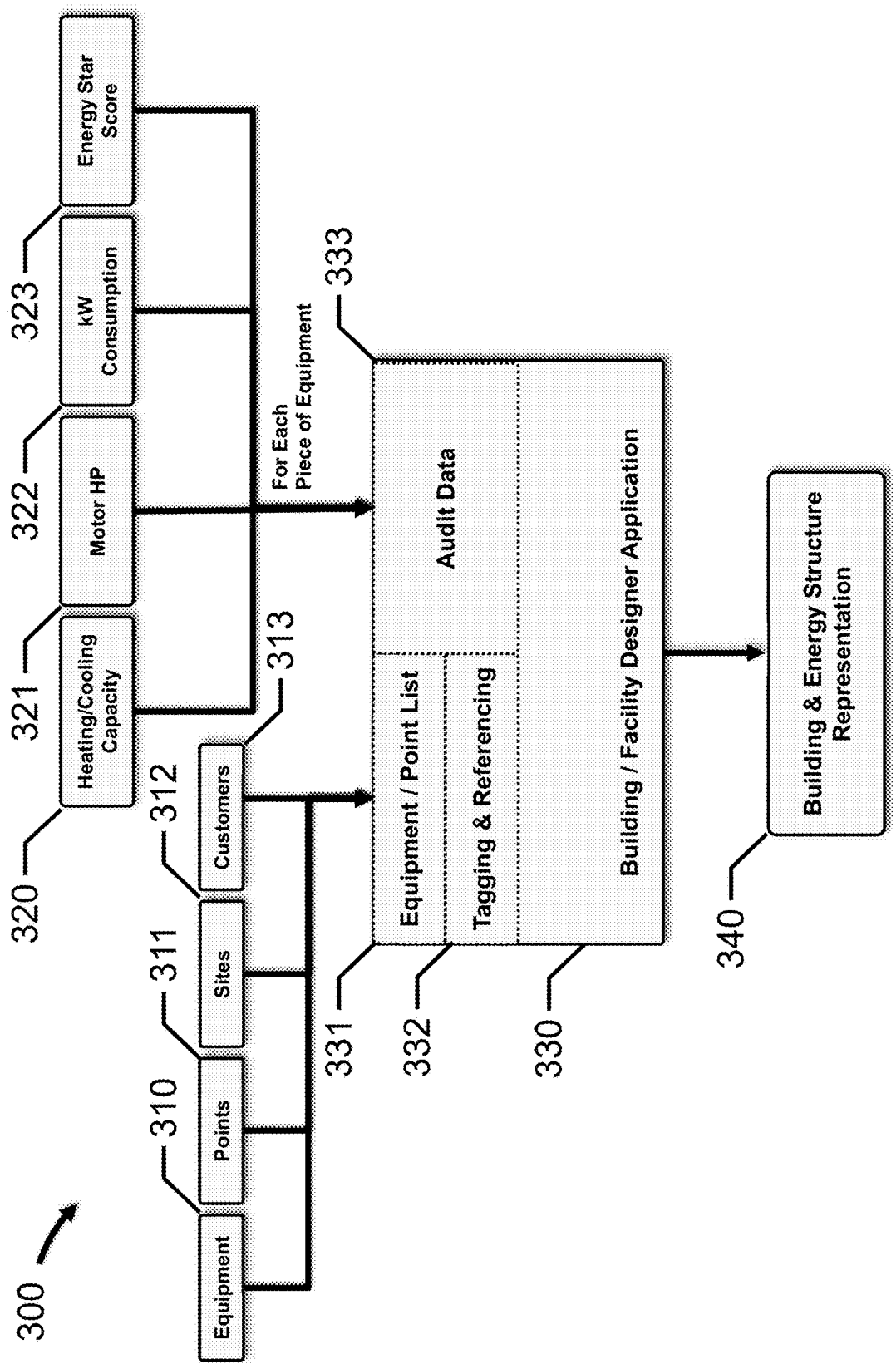
FIG. 3 illustrates a building/facility designer data flow block diagram, in accordance with an embodiment of the present disclosure.

FIG. 3 illustrates a building/facility designer data flow block diagram 300, in accordance with an embodiment of the present disclosure.

Embodiments of the present disclosure advantageously provide a building/facility designer software application 330 that models the equipment and energy structure of a building or facility in an expeditious manner. In certain embodiments, building/facility designer software application 330 runs on a remote server and includes a web-based graphical user interface (GUI) that allows a user to enter all of the data and metadata for a facility using a local computer. In other embodiments, building/facility designer software application 330 runs on a local computer or server that is accessible by the user. Building/facility designer software application 330 may include several modules, such as equipment/point list module 331, tagging & referencing module 332, audit data module 333, etc.

Building/facility designer software application 330 stores various data in memory, such as, for example, equipment data 310, points data 311, site data 312, customer data 313, etc.

A user initially creates a site and enters site-related equipment data, such as, for example, heating/cooling capacity 320, motor horsepower (hp) 321, kW consumption 322, energy star score 323, etc., for each piece of equipment located at that site. Building/facility designer software application 330 may include efficiency tools (such as the ability to copy or duplicate equipment so that the user does not need to enter redundant information).

After creating a piece of equipment, a user may create points for that equipment. These points may also have a hash, which allows building/facility designer software application 330 to identify the unique ID of that point in a user's originating database (UOD). If there are multiple users with the same type of on-site system, there may be a good chance that their unique IDs for the points overlap. Using the hash, the system can identify the original point in the UOD and translate that to the system's point ID, which may be unique throughout building/facility designer software application 310. For site, equipment, and points, a user may also be allowed to tag the entity as they create it to standardize what type of point it is regardless of readable name.

Once a user has entered all of the facility's contents and structure, a user can then enter an energy structure. For any point that has been created that also determines if an energy consuming device is running, a user can associate the amount of energy that the device consumes. A user can also create a rate schedule for a site that allows the system to know how much the energy consumed is costing a customer. Building and energy structure representation 340 may then be displayed to the user via the GUI. In certain embodiments, the building and energy structure representation 340 may be standardized and normalized.

Figure 4:
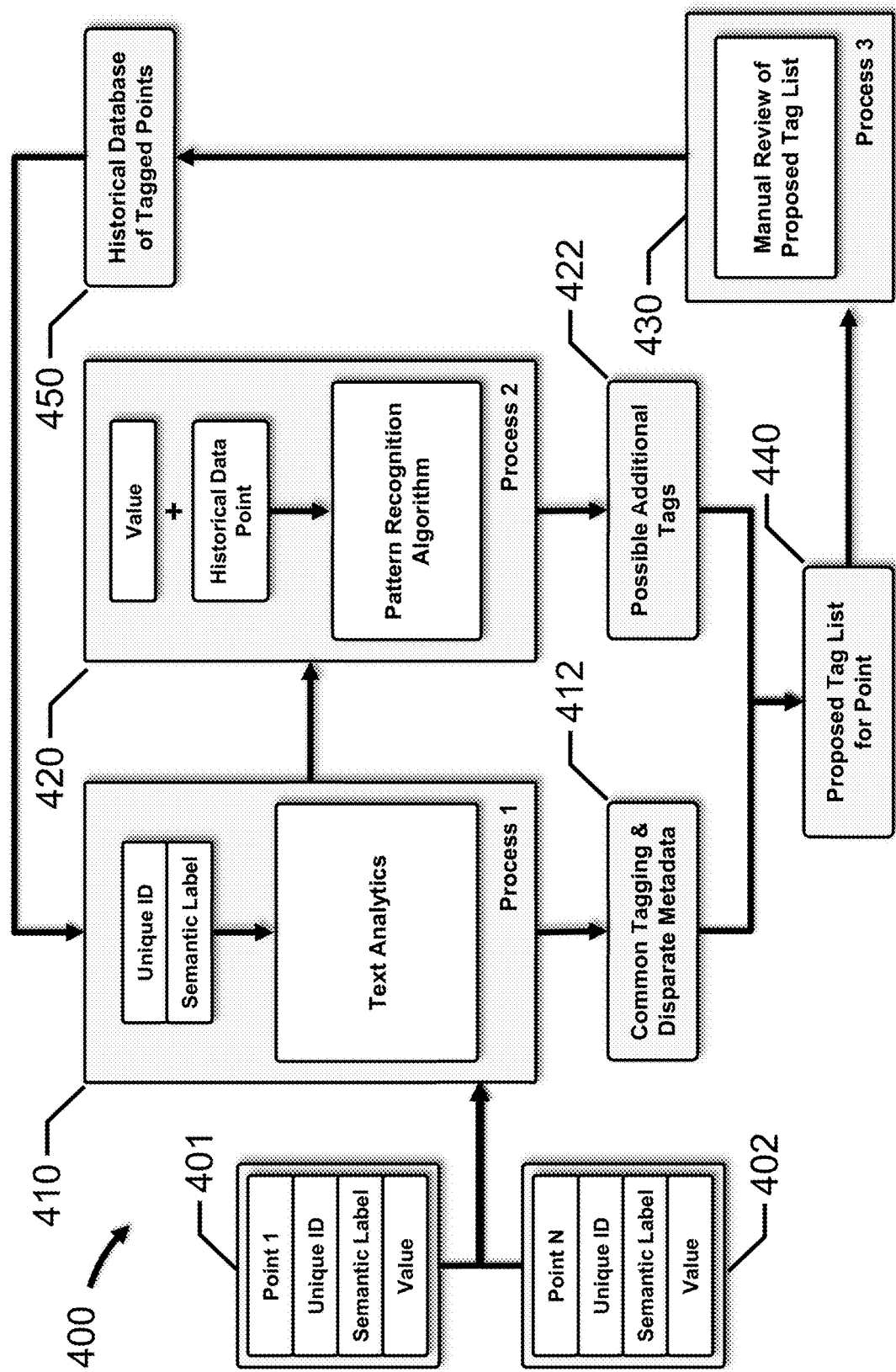
FIG. 4 illustrates a point mapping pipeline data flow, in accordance with an embodiment of the present disclosure.

FIG. 4 illustrates a point mapping pipeline data flow 400, in accordance with an embodiment of the present disclosure.

A building automation system point, such as point 401 (i.e., "point 1"), point 402 (i.e., "point N"), etc., may have three attributes (which are generally referred to herein as "point attributes"): (1) a unique identifier (ID) in the building automation system from which the point originated; (2) a semantic label used for human comprehension, which may or may not be independent from the aforementioned unique identifier; and (3) a value associated with that point. The point mapping pipeline may use a multi-phased approach that combines these three attributes to provide automatic tagging, along with provisions for continuous improvements in accuracy.

The point mapping pipeline may include process 410 (i.e., "Process 1"), process 420 (i.e., "Process 2") and process 430 (i.e., "Process 3").

In process 410, the point mapping pipeline may apply to point attributes (1) and (2) described above, i.e., a combination of text analytics such as tokenization, Levenshtein distance analysis, fuzzy set matching, and clustering to identify like points for common, batch tagging, and may simultaneously identify disparate string tokens within point attributes (1) and (2) that will be used to uniquely identify points such as numeric point identifiers, floor numbers, zone labels, and other disparate metadata. This additional processing is provided by provided by common tagging & disparate metadata module 412.

In process 420, the point mapping pipeline may apply to the point attribute 3 described above, e.g., on a historical and future basis, pattern recognition algorithms that use the point's value over time, along with, but not limited to, time of day, day of week, month of year, and season may be used to determine a likely set of tags for that point. Additional tags may be provided by possible additional tags module 422.

Process 430 may include an optional, manual review of the results of processes 410 and 420. Process 430 can be performed at any time for any number of points. Resulting human driven approvals or corrections from process 430 may drive a reinforcement learning algorithm that will automatically update processes 410 and 420 on an ongoing basis. This may ensure long term-improvement and embedded quality control of the point mapping pipeline. The data are entered then into historical database of tagged points 450.

Figure 5:
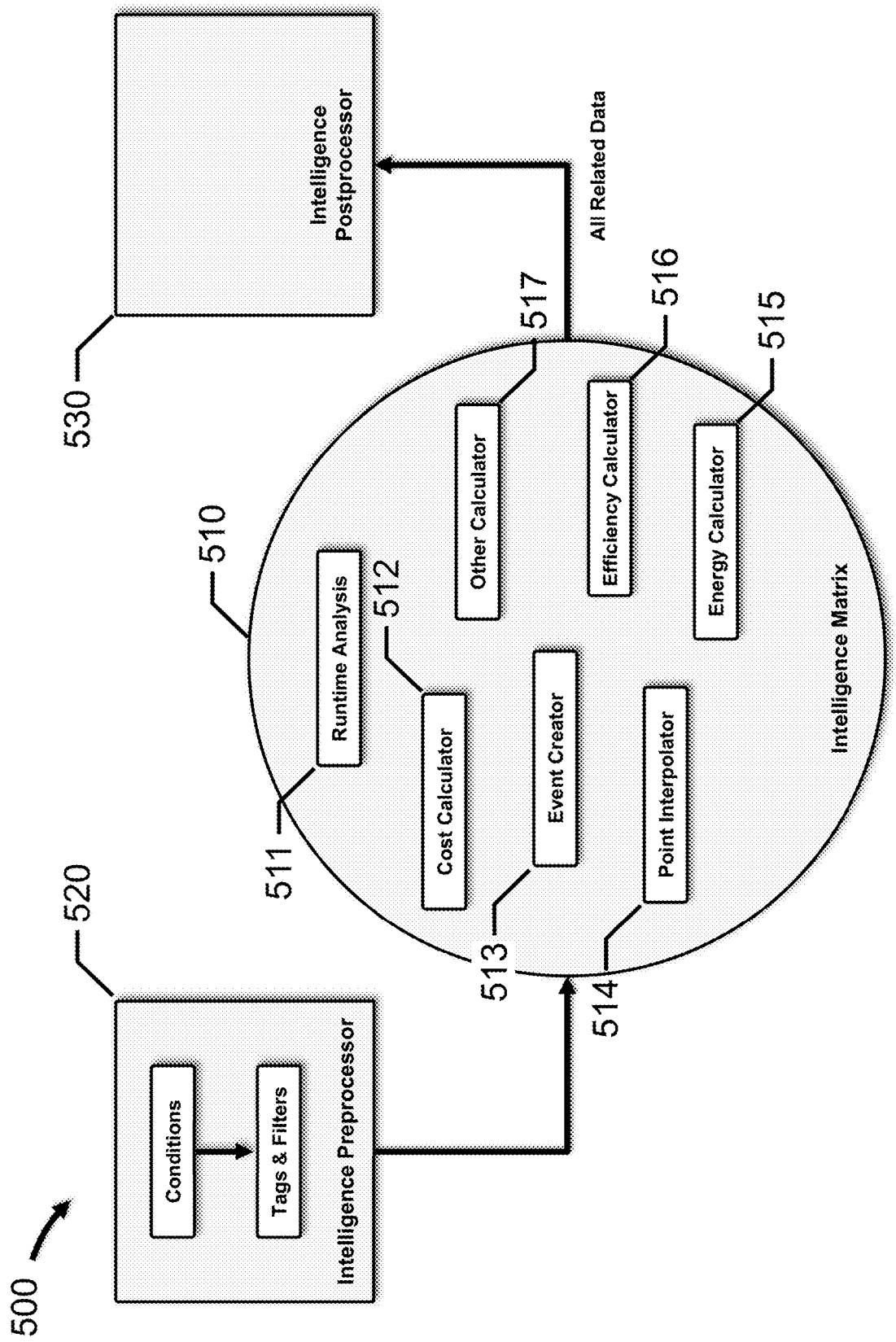
FIG. 5 illustrates a scalable and pluggable intelligence data flow diagram, in accordance with an embodiment of the present disclosure.

FIG. 5 illustrates a scalable and pluggable intelligence data flow diagram 500, in accordance with an embodiment of the present disclosure.

Embodiments of the present disclosure include a pluggable intelligence—an infrastructure that allows the system to minimize code needed to create intelligence that applies to an ecosystem of the present disclosure. The pluggable intelligence may include intelligence matrix 510, intelligence preprocessor 520 and intelligence postprocessor 530.

Intelligence matrix 510 may include a suite of tools that accompanying intelligence applications can use whenever necessary, including, for example, runtime analysis tool 511, cost calculator 512, event creator 513, point interpolator 514, energy calculator 515, efficiency calculator 516, other calculator 517, etc.

Intelligence preprocessor 520 uses the tagging structure described above to determine which pieces of equipment/points are applicable for the intelligence. Next, the data for the intelligence is gathered from intelligence matrix 510. Once all of the related data is returned, intelligence postprocessor 530 looks for instances of the event that the system is seeking to find. Because the intelligence may be based on tags, the system can write generic pieces of intelligence about the tags, and any piece of equipment that contains those tags will automatically be allowed to use that intelligence. This may also mean that, when onboarding a new facility, if the equipment is tagged, intelligence that uses those tags may automatically be applied solely because that equipment exists in a system with the proper tags. This means that system may not need to rewrite any existing intelligence to work with additional facilities.

Figure 6:
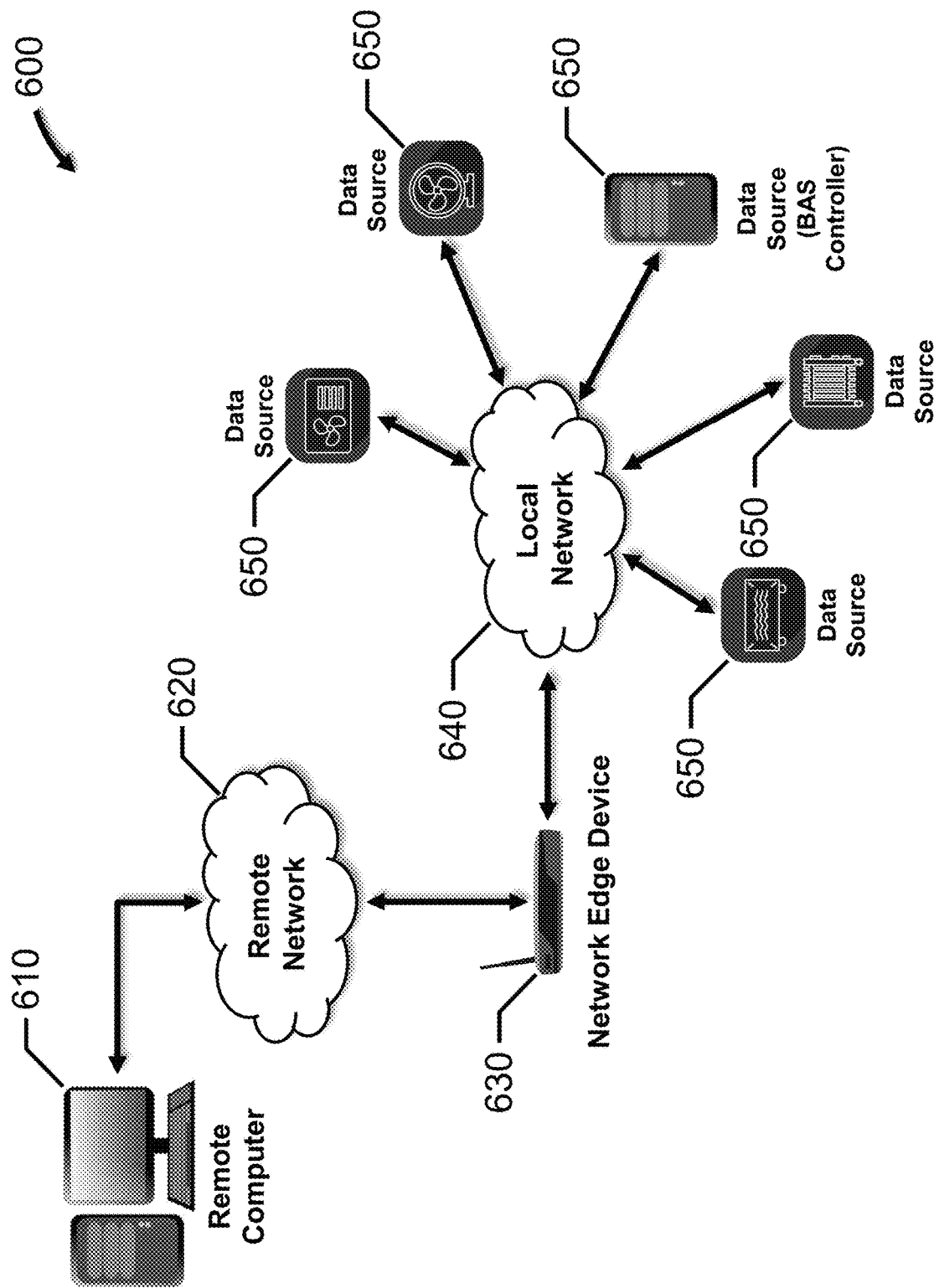
FIG. 6 illustrates a block diagram for a system, in accordance with an embodiment of the present disclosure.

FIG. 6 illustrates a block diagram for a system 600, in accordance with an embodiment of the present disclosure.

System 600 includes remote server 610 coupled to remote network 620, network edge device 630 coupled to remote network 620 and local network 640, and one or more data sources 650 coupled to local network 640. Data sources 650 may include, for example, a heat exchanger, heat pump, fan, BAS controller, etc. Network edge device 630 provided the same functionality as network edge device 230.

Figure 7:
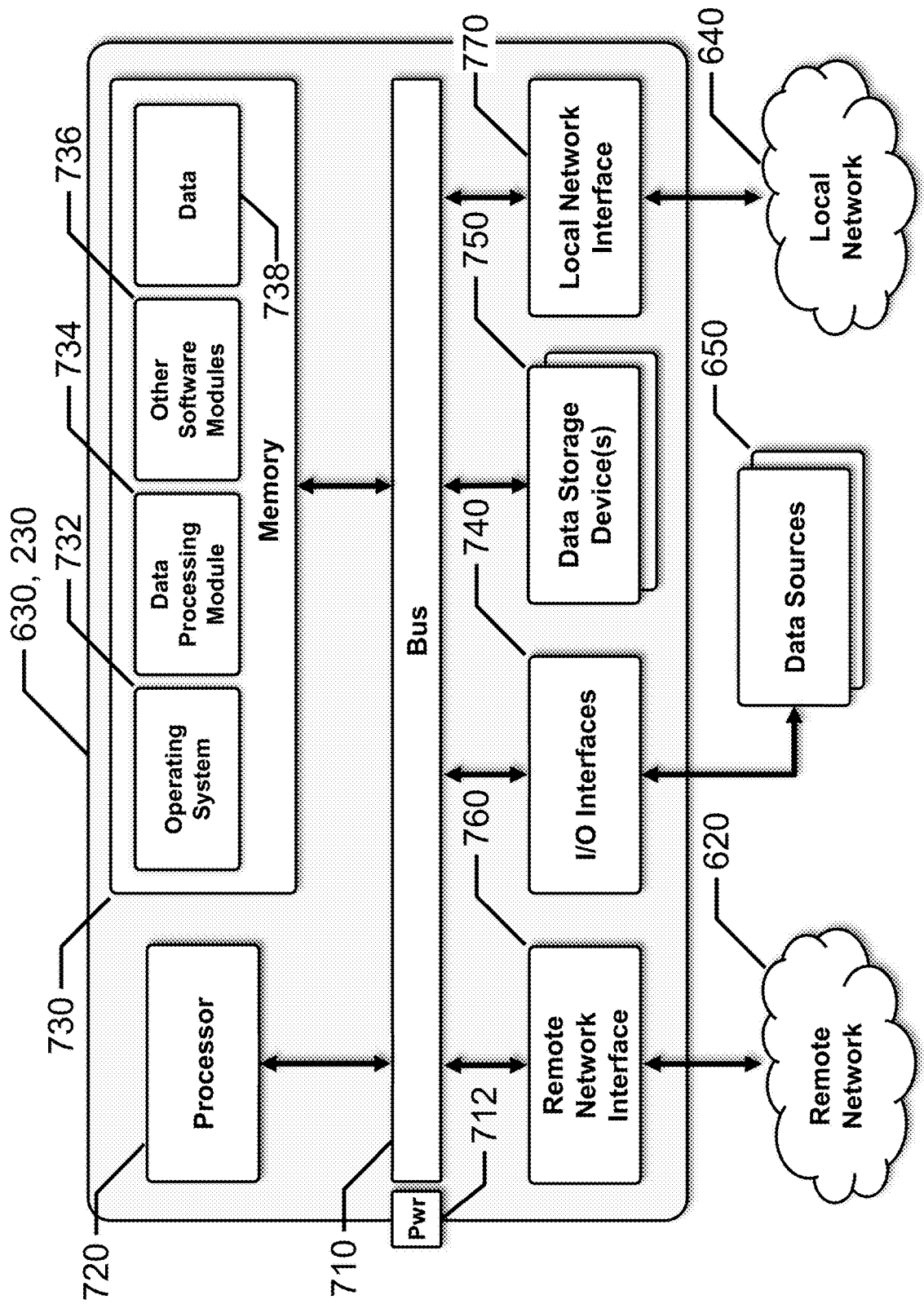
FIG. 7 illustrates a block diagram for network edge device, in accordance with an embodiment of the present disclosure.

FIG. 7 illustrates a block diagram for network edge device 630, in accordance with an embodiment of the present disclosure. In certain embodiments, network edge device 230 includes the same components as network edge device 630.

Network edge device 630 includes communication bus 110 coupled to one or more processors 720, memory 730, I/O interfaces 740, data storage device(s) 750, one or more communication interfaces including remote network interface 760 and local network interface 770. Generally, I/O interfaces 740 are coupled to data sources 650 using a wired or wireless connection; I/O interfaces 740 may also be coupled to other I/O devices. Data storage devices 750 include non-volatile memory, such as, for example, hard disks, flash drives, etc. Remote network interface 760 is configured to connect to remote network 620, and local network interface 770 is configured to connect to local network 640.

Communication bus 710 is a communication system that transfers data between processor 720, memory 730, I/O interfaces 740, data storage device(s) 750, remote network interface 760 and local network interface 770, as well as other components not depicted in FIG. 7. Power connector 712 is coupled to communication bus 710 and a power supply (not shown). In certain embodiments, communication bus 710 is a network-on-chip (NoC).

Processor 720 includes one or more general-purpose or application-specific microprocessors that executes instructions to perform control, computation, input/output, etc. functions for network edge device 630. Processor 720 may include a single integrated circuit, such as a micro-processing device, or multiple integrated circuit devices and/or circuit boards working in cooperation to accomplish the functions of processor 720. Additionally, processor 720 may include multiple processing cores. Generally, network edge device 630 may include one or more processors 720, each containing one or more processing cores.

In many embodiments, processor 720 may execute computer programs or modules, such as operating system 732, data processing module 734, other software modules 736, data 738, etc., stored within memory 730. For example, data processing module 734 may include building/facility designer software application 330, etc.

Generally, storage element or memory 730 stores instructions for execution by processor 720 and data. Memory 730 may include a variety of non-transitory computer-readable medium that may be accessed by processor 720. In various embodiments, memory 730 may include volatile and non-volatile medium, non-removable medium and/or removable medium. For example, memory 730 may include any combination of random access memory (RAM), dynamic RAM (DRAM), static RAM (SRAM), read only memory (ROM), flash memory, cache memory, and/or any other type of non-transitory computer-readable medium.

Memory 730 contains various components for retrieving, presenting, modifying, and storing data. For example, memory 730 stores software modules that provide functionality when executed by processor 720. The software modules include operating system 732 that provides operating system functionality for network edge device 630. Data processing module 734 and other software modules 736 provide various functionality, while data 738 may include data associated with operating system 132, data processing module 734, other software modules 736, etc.

I/O interfaces 740 are configured to transmit and/or receive data from data sources 650 and other I/O devices. I/O interfaces 740 enable connectivity between processor 720 and data sources 650 by decoding data received from data sources 650 for processor 720. Generally, data may be sent over wired and/or wireless connections. For example, I/O interfaces 740 may include one or more wired communications interfaces, such as USB, Ethernet, etc., and/or one or more wireless communications interfaces, coupled to one or more antennas, such as WiFi, Bluetooth, cellular, etc. Generally, I/O devices may include a keyboard, mouse, touch pad, joystick, etc.

Generally, data sources 650 provide input to network edge device 630. As discussed above, data sources 650 are operably connected to network edge device 630 using a wired and/or wireless connection. data sources 650 may include a local processor coupled to a communication interface that is configured to communicate with network edge device 630 using the wired and/or wireless connection.

Data received from data sources 650 may be stored in data storage device 750 and/or memory 730.

Remote network interface 760 is configured to transmit data to and from remote network 620 using one or more wired and/or wireless connections. Remote network 620 may include one or more local area networks, wide area networks, the Internet, etc., which may execute various network protocols, such as, for example, wired and/or wireless Ethernet, Bluetooth, etc. Remote network 620 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Local network interface 770 is configured to transmit data to and from local network 640 using one or more wired and/or wireless connections. Local network 640 may include one or more local area networks, wide area networks, the Internet, etc., which may execute various network protocols, such as, for example, wired and/or wireless Ethernet, Bluetooth, etc. Local network 640 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Figure 8A:
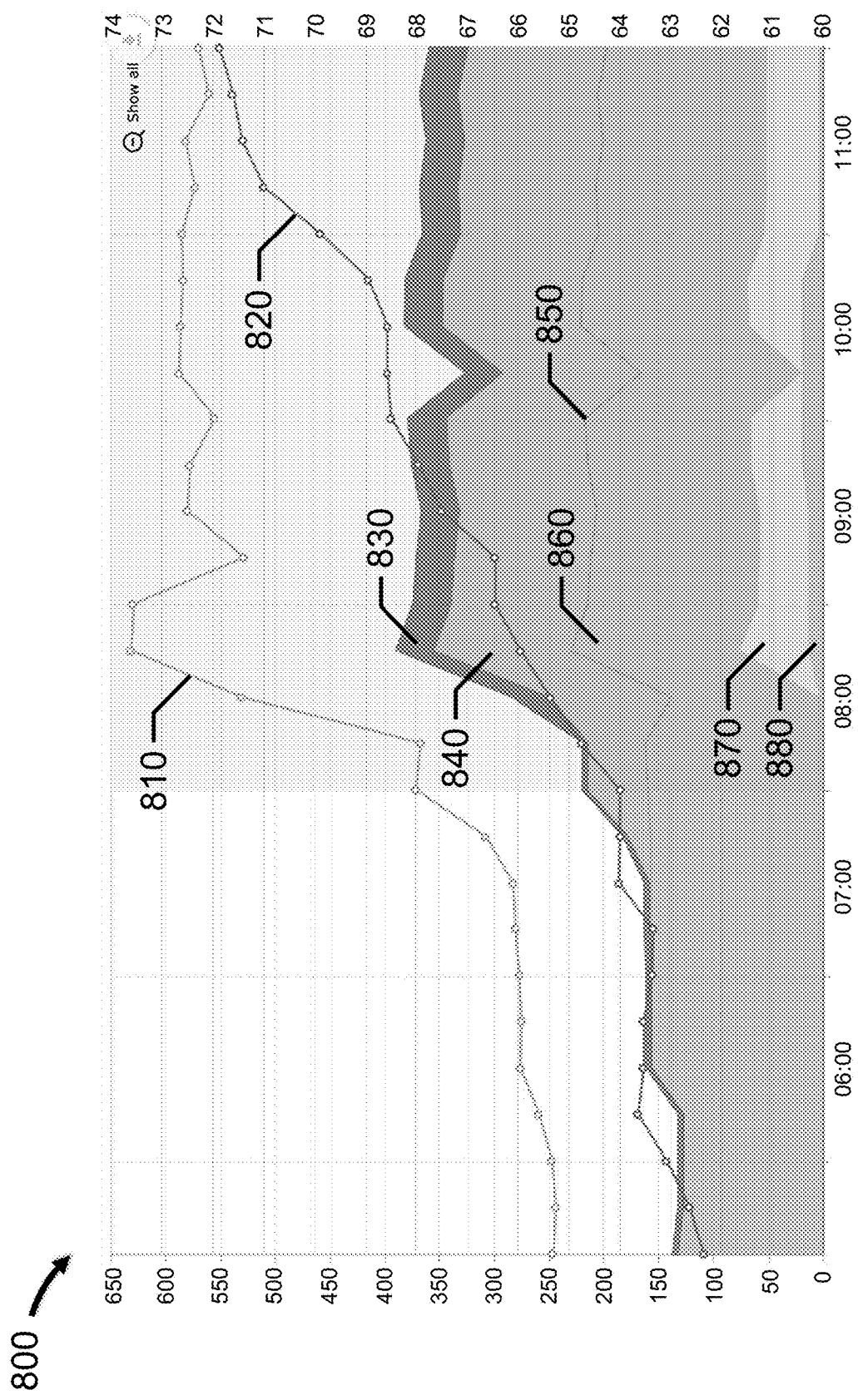
FIGS. 8A and 8B illustrate a graphical user interface, in accordance with an embodiment of the present disclosure.
Figure 8B:
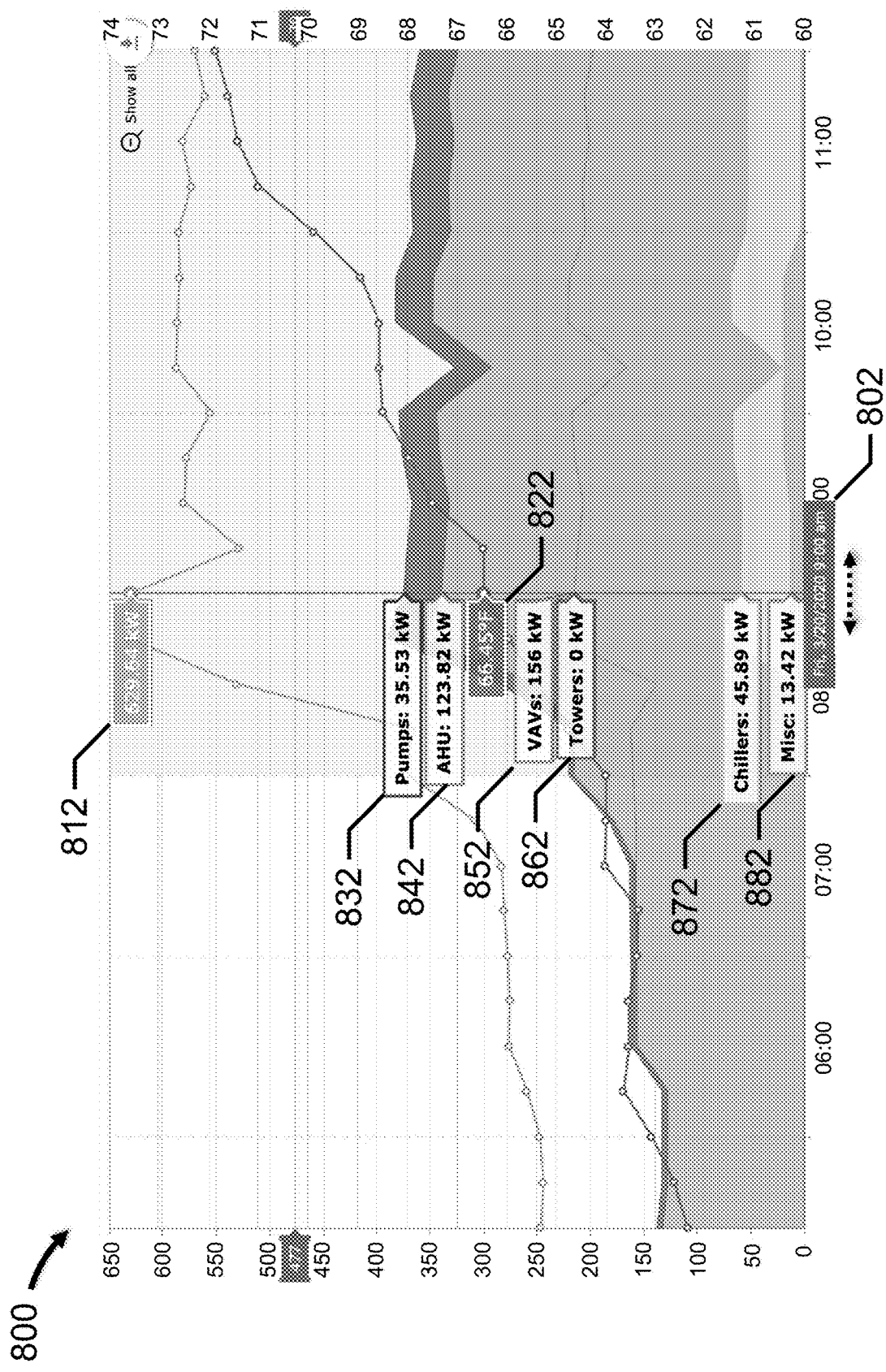

FIGS. 8A and 8B illustrate a graphical user interface 800, in accordance with an embodiment of the present disclosure.

Generally, GUI 800 displays data collected from several data sources over time, with kW along the left axis, temperature along the right axis and time along the bottom axis. FIGS. 8A and 8B display data collected for a 3 hour time window, from 6 am to 9 am, including measured overall building power 810 in kW, outside air temperature (OAT) data 820 in degrees F., pump data 830 in kW, air handler unit (AHU) data 840 in kW, variable air volume (VAV) system data 850, tower data 860 in kW (0 kW in this example, represented as a simple line), chiller data 870 in kW, and miscellaneous data 880 in kW. The data are displayed in a stacked fashion.

FIG. 8B displays a movable, data slice line 802 through the data at a particular date and time (i.e., Friday, Mar. 20, 2020 9:00 am). The particular value for each data source is displayed adjacent to data slice line 802, e.g., measured overall building power data value 812 (629.64 kW), OAT data value 822 (66.45 degrees F.), pump data value 832 (35.53 kW), AHU data value 842 (123.82 kW), VAV system data value 852 (156 kW), tower data value 862 (0 kW), chiller data value 872 (45.89 kW), and miscellaneous data value 880 (13.42 kW).

FIG. 9A illustrates a graphical user interface 900, in accordance with an embodiment of the present disclosure.

Generally, GUI 900 displays alert data relating to wasted energy and the related costs for the data sources. In this embodiment, certain AHUs have been identified as having an excess runtime, including equipment 930 ("AHU 7 East"), equipment 931 ("AHU 3"), equipment 932 (""AHU 5 East"), equipment 933 ("AHU 2"), equipment 934 ("AHU 10 West") and equipment 935 ("AHU 11 West"). Each alert is displayed on a single line, and may contain several data fields.

GUI 900 displays a text header for each type of data field, including text header 910 ("Alert Name") for data fields 920, text header 911 ("Equip Name") for data fields 921, text header 912 ("Point Name") for data fields 922, text header 913 ("Start Date") for data fields 923, text header 914 ("End Date") for data fields 924, text header 915 ("kWh Wasted") for data fields 925, text header 916 ("Consumption Cost") for data fields 926, text header 917 ("Max kW") for data fields 927, text header 918 ("Demand Cost") for data fields 928, and text header 919 ("Projected Annual Cost") for data fields 929.

Figure 9B:
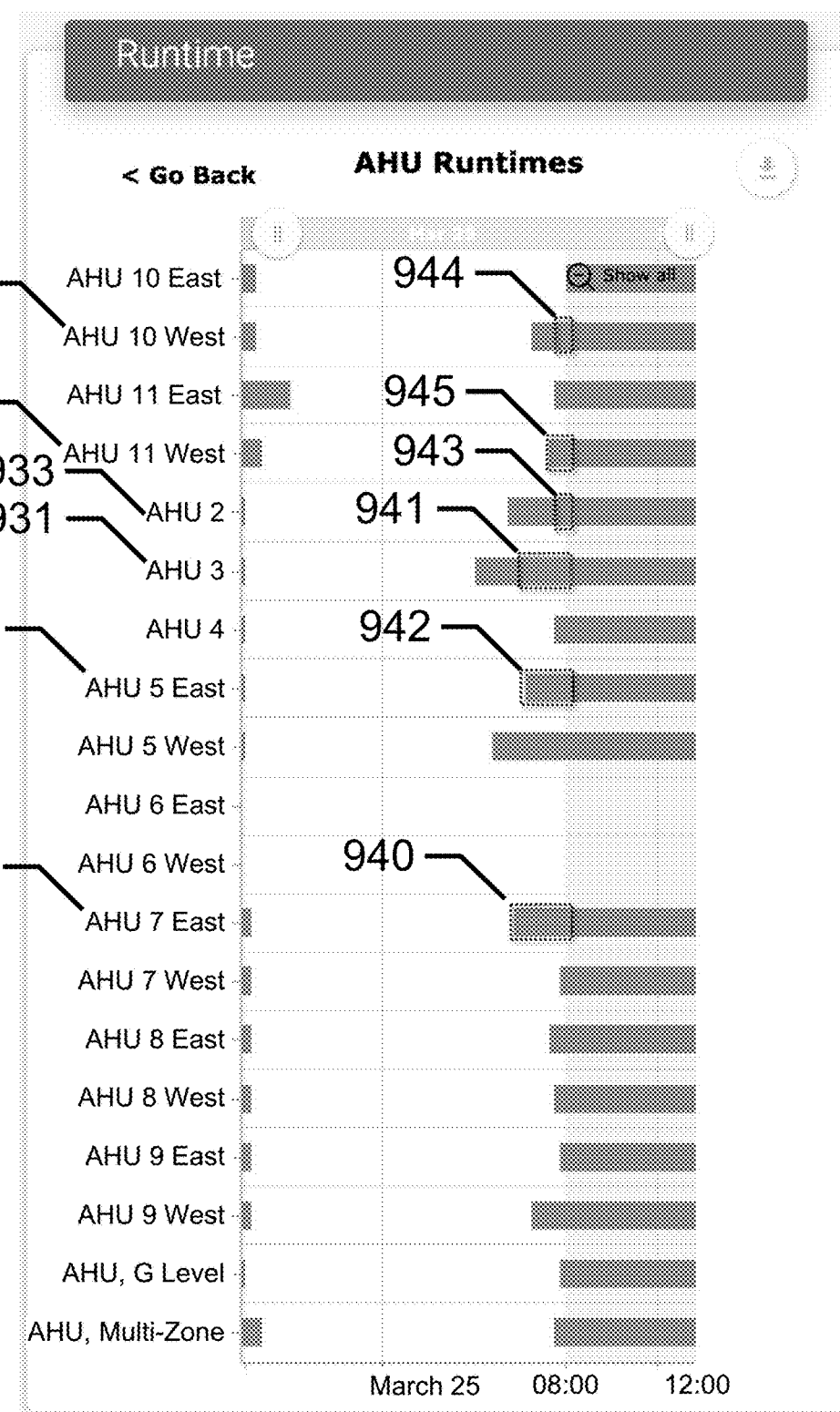

FIG. 9B illustrates a graphical user interface 902, in accordance with an embodiment of the present disclosure.

GUI 902 displays a runtime timeline for each monitored AHU, including, for example, AHU 10 East, AHU 10 West, AHU 11 East, AHU 11 West, AHU 2, AHU 3, AHU 4, AHU 5 East, AHU 5 West, AHU 6 East, AHU 6 West, AHU 7 East, AHU 7 West, AHU 8 East, AHU 8 West, AHU 9 East, AHU 9 West, AHU G Level and AHU Multi-Zone. The alerts displayed in GUI 900 may be identified in the AHU runtimes displayed in GUI 902.

For example, the alert name for equipment 930 ("AHU 7 East") displayed in GUI 900 is "AHU Early Start" (data field 920), which has a start date of "Mar. 25, 2020 06:15 am" (data field 923) and an end date of "2020-03-25 08:15 am" (data field 924). Because GUI 902 displays the runtime for equipment 930 ("AHU 7 East"), the portion of the runtime that corresponds to the "AHU early start" alert is easily identified, and has been highlighted as excess runtime 940. The remaining alerts depicted in GUI 900 are also displayed on GUI 902, i.e., equipment 931 ("AHU 3") and excess runtime 941, equipment 932 ("AHU 5 East") and excess runtime 942, equipment 933 ("AHU 2") and excess runtime 943, equipment 934 ("AHU 10 West") and excess runtime

944, and equipment 935 ("AHU 11 West") and excess runtime 945. For certain AHUs, the excess runtime alert is triggered when the AHU turns on, e.g., equipment 930, equipment 932 and equipment 935, while for other AHUs, the excess runtime alert is triggered after the AHU turns on, e.g., equipment 931, equipment 933 and equipment 934.

Figure 10:
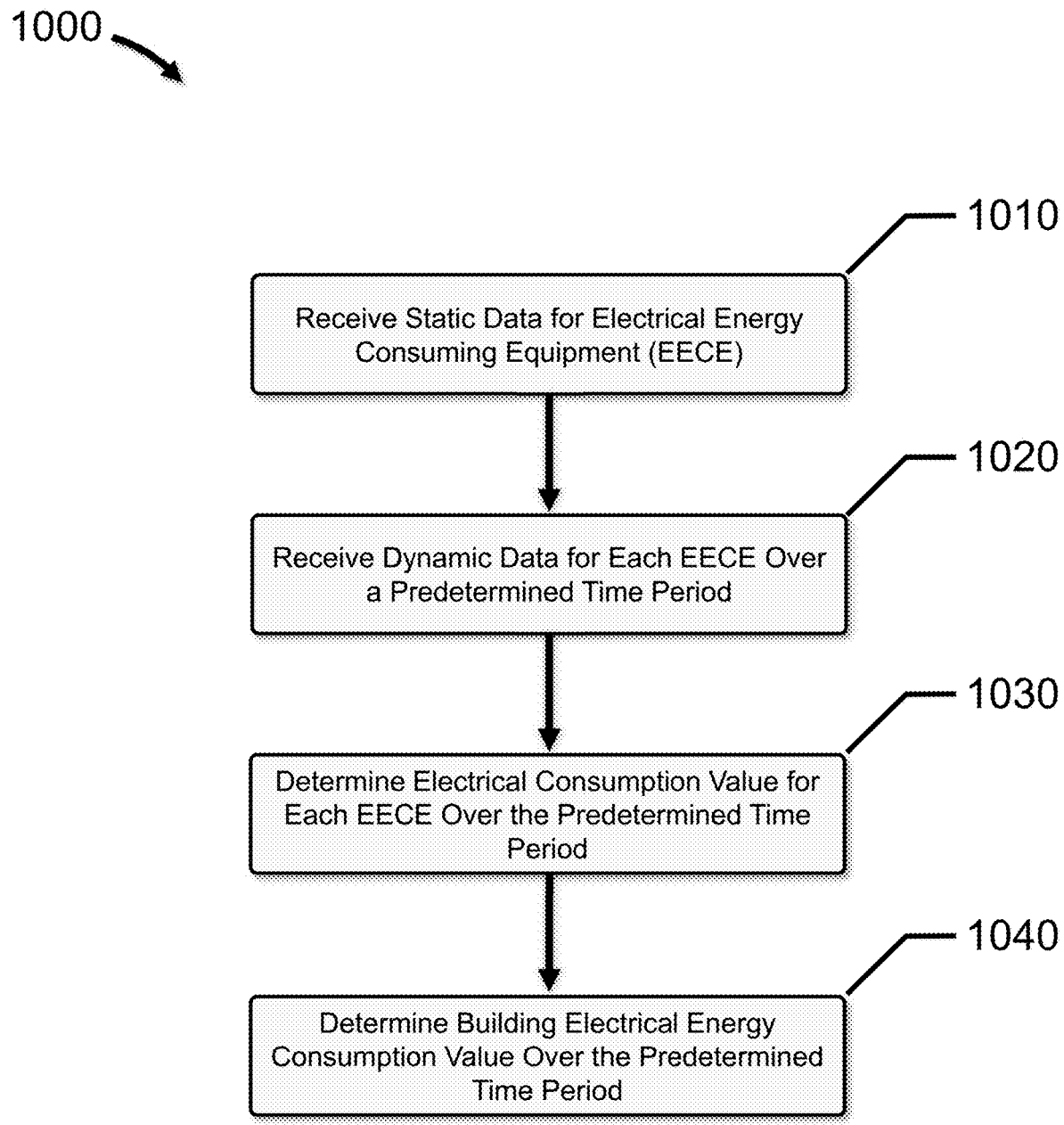
FIG. 10 depicts a flow diagram presenting functionality for transmitting data at a network edge device, in accordance with embodiments of the present disclosure.

FIG. 10 depicts a flow diagram 1000 presenting functionality for transmitting data at a network edge device, in accordance with embodiments of the present disclosure.

At 1010, data from each local data source is received. The local data sources are coupled to a local network.

At 1020, a filter parameter set for each local data source is received from a remote computer coupled to a remote network. Each filter parameter set includes a data rate parameter and at least one of a minimum threshold parameter, a maximum threshold parameter or a change-of-value (COV) parameter.

The functionality at 1030, 1040 and 1050 is performed for each local data source.

At 1030, each data value received from the local data source is compared to at least one of the minimum threshold parameter, the maximum threshold parameter or the COV parameter.

At 1040, when the data value is less than the minimum threshold parameter, or when the data value is greater than the maximum threshold parameter, or when a difference between the data value and an immediately preceding data value is greater than the COV parameter, flow proceeds to 1050. Otherwise, flow returns to 1030.

At 1050, the data value and subsequent data values are sent to the remote computer at a data rate that is based on the data rate parameter.

The embodiments described herein are combinable.

In one embodiment, a network edge device includes a local network interface, a remote network interface, a memory and a processor. The local network interface is configured to receive data from a plurality of local data sources over a local network. The remote network interface is configured to communicate with a remote computer over a remote network. The memory is configured to store the data received from the local data sources.

The processor is configured to receive, from the remote computer, a filter parameter set for each local data source, each filter parameter set including a data rate parameter and at least one of a minimum threshold parameter, a maximum threshold parameter or a change-of-value (COV) parameter. For each local data source, the processor is configured to compare each data value received from the local data source to at least one of the minimum threshold parameter, the maximum threshold parameter or the COV parameter, and when the data value is less than the minimum threshold parameter, send the data value and subsequent data values to the remote computer at a data rate that is based on the data rate parameter, or when the data value is greater than the maximum threshold parameter, send the data value and subsequent data values to the remote computer at a data rate that is based on the data rate parameter, or when a difference between the data value and an immediately preceding data value is greater than the COV parameter, send the data value and subsequent data values to the remote computer at a data rate that is based on the data rate parameter.

In another embodiment of the network edge device, the data rate parameter specifies a single data value or a predetermined number of data values per second, minute or hour.

In another embodiment of the network edge device, at least one of the local data sources includes a sensor configured to measure an attribute of a mechanical device, an electrical device or an electromechanical device; and a local network interface, coupled to the sensor and the local network, configured to transmit the measured attribute as a data value.

In another embodiment of the network edge device, the sensor is a speed sensor, an electrical current sensor, an electrical voltage sensor, an electrical power sensor, a pressure sensor, or a temperature sensor; and when the sensor is the speed sensor, the measured attribute is rotational speed, and the data value is a speed value, or when the sensor is the electrical current sensor, the measured attribute is electrical current, and the data value is a current value, or when the sensor is the electrical voltage sensor, the measured attribute is electrical voltage, and the data value is a voltage value, or when the sensor is the electrical power sensor, the measured attribute is electrical power, and the data value is a power value, or when the sensor is the pressure sensor, the measured attribute is pressure, and the data value is a pressure value, or when the sensor is the temperature sensor, the measured attribute is temperature, and the data value is a temperature value.

In another embodiment of the network edge device, at least one of the local data sources is a local computer, coupled to the local network, storing data associated with one or more components of a building automation system (BAS) or a building automation and control (BAC) system.

In another embodiment of the network edge device, at least one of the local data sources includes a sensor configured to measure a physical attribute of a building that includes the local network; and a local network interface, coupled to the sensor and the local network, configured to transmit the measured physical attribute as a data value.

In another embodiment of the network edge device, the sensor is a camera, an acoustic sensor or a temperature sensor; and when the sensor is the camera, the measured physical attribute is an image, the data value is an image pixel value, and the minimum threshold parameter is an image pixel value for one or more image pixels, or the maximum threshold parameter is an image pixel value for one or more image pixels or the COV parameter is a change in an image pixel value for one or more image pixels, or when the sensor is the acoustic sensor, the measured physical attribute is sound or vibration, and the data value is a sound pressure level value or a vibration level value, or when the sensor is the temperature sensor, the measured physical attribute is temperature, and the data value is a temperature value.

In another embodiment of the network edge device, at least one of the local data sources is a local computer, coupled to the local network, storing data associated with one or more components of a building security system.

In another embodiment of the network edge device, here the processor is further configured to receive, from the remote computer, a start command to start transmitting data from one of the local data sources, the start command including a command data rate parameter that is different than the data rate parameter; and after the start command is received, suspend comparing each data value received from said one of the local data sources to at least one of the minimum threshold parameter, the maximum threshold parameter or the COV parameter, and send, to the remote computer, data values from said one of the local data sources at a data rate that is based on the command data rate parameter.

In another embodiment of the network edge device, the processor is further configured to receive, from the remote computer, a stop command to stop transmitting data from said one of the local data sources; and after the stop command is received, stop sending, to the remote computer, data values from said one of the local data sources at the data rate based on the command data rate parameter, and resume comparing each data value received from said one of the local data sources to at least one of the minimum threshold parameter, the maximum threshold parameter or the COV parameter.

In another embodiment of the network edge device, the filter parameter set for at least one local data source further includes a background data rate parameter that is less than the data rate parameter, and the processor is further configured to send, to the remote computer, a data value from the at least one local data source at a data rate this is based on the background data rate parameter.

In one embodiment, a computer-based method for transmitting data at a network edge device includes receiving, from a plurality of local data sources coupled to a local network, data from each local data source; receiving, from a remote computer coupled to a remote network, a filter parameter set for each local data source, each filter parameter set including a data rate parameter and at least one of a minimum threshold parameter, a maximum threshold parameter or a change-of-value (COV) parameter; and for each local data source comparing each data value received from the local data source to at least one of the minimum threshold parameter, the maximum threshold parameter or the COV parameter, and when the data value is less than the minimum threshold parameter, sending the data value and subsequent data values to the remote computer at a data rate that is based on the data rate parameter, or when the data value is greater than the maximum threshold parameter, sending the data value and subsequent data values to the remote computer at a data rate that is based on the data rate parameter, or when a difference between the data value and an immediately preceding data value is greater than the COV parameter, sending the data value and subsequent data values to the remote computer at a data rate that is based on the data rate parameter.

In another embodiment of the computer-based method, the data rate parameter specifies a single data value or a predetermined number of data values per second, minute or hour.

In another embodiment, the computer-based method further includes, at one or more of the local data sources measuring, by a sensor, an attribute of an electrical device or an electromechanical device; and transmitting, by a local network interface coupled to the sensor and the local network, the measured attribute as a data value.

In another embodiment of the computer-based method, at least one of the local data sources is a local computer, coupled to the local network, storing data associated with one or more components of a building automation system (BAS) or a building automation and control (BAC) system.

In another embodiment, the computer-based method further includes, at one or more of the local data sources measuring, by a sensor, a physical attribute of a building that includes the local network; and transmitting, by a local network interface coupled to the sensor and the local network, as a data value.

In another embodiment of the computer-based method, at least one of the local data sources is a local computer, coupled to the local network, storing data associated with one or more components of a building security system.

In another embodiment, the computer-based method further includes receiving, from the remote computer, a start command to start transmitting data from one of the local data sources, the start command including a command data rate parameter that is different than the data rate parameter; and after the start command is received, suspending comparing each data value received from said one of the local data sources, and sending, to the remote computer, data values from said one of the local data sources at a data rate that is based on the command data rate parameter; receiving, from the remote computer, a stop command to stop transmitting data from said one of the local data sources; and after the stop command is received, stopping said sending, to the remote computer, data values from said one of the local data sources at the data rate based on the command data rate parameter, and resuming said comparing each data value received from said one of the local data sources to at least one of the minimum threshold parameter, the maximum threshold parameter or the COV parameter.

In another embodiment of the computer-based method, the filter parameter set for at least one local data source further includes a background data rate parameter that is less than the data rate parameter, and the method further comprising sending, to the remote computer, a data value from the at least one local data source at a data rate this is based on the background data rate parameter.

In another embodiment, a non-transitory computer-readable medium storing instructions that, when executed by a network edge device processor, cause the network edge device processor to transmit data according to the computer-based method.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A computer-based method for tagging building automation system (BAS) points for a building, comprising:
   receiving, from a BAS or other data source over a network, static data for a plurality of electrical energy-consuming equipment (EECE) associated with the building, the static data including one or more performance attributes for each EECE;
   receiving, from the BAS or a network edge device over the network, dynamic data for each EECE, the dynamic data including measured performance data for each EECE over a predetermined time period;
   determining a BAS point for each EECE based on the static data and the dynamic data, each BAS point having a plurality of attributes including a unique identifier (ID), a sematic label, and one or more measured performance values;
   for each BAS point:
      generating one or more common tags based on the unique ID and the semantic label,
      generating one or more additional tags based on the measured performance values, and
      generating a tag list based on the common tags and the additional tags;
   generating a tagged point database based on the tag list for each BAS point; and
   determining from the the tagged point database generated for each BAS point one or more EECE of the plurality of EECE associated with the building to be included in an intelligence matrix analysis of the building, the determining performed by an intelligence preprocessor prior to the intelligence matrix analysis of the building.

2. The computer-based method according to claim 1, where each common tag is a descriptive text string.

3. The computer-based method according to claim 2, where:
   said generating one or more common tags includes tokenizing, analyzing Levenshtein distances, matching fuzzy sets, or clustering to identify similar BAS points.

4. The computer-based method according to claim 3, where:
   said generating one or more common tags further includes identifying disparate string tokens within the unique ID and the semantic label to uniquely identify numeric point identifiers, floor numbers, zone labels, or other disparate metadata.

5. The computer-based method according to claim 1, where each additional tag is a descriptive text string.

6. The computer-based method according to claim 5, where:
   said generating one or more additional tags includes recognizing a pattern within the measured performance values over time.

7. The computer-based method according to claim 1, further comprising:
   receiving, from a user, one or more tag list corrections; and
   updating the tagged point database based on the tag list corrections.

8. The computer-based method according to claim 7, where:
   said generating one or more common tags is further based on the tag list corrections.

9. The computer-based method according to claim 7, where:
   said generating one or more additional tags is further based on the tag list corrections.

10. The computer-based method according to claim 1, further comprising: displaying, via a graphical user interface (GUI), the tag list for one or more BAS points.

11. The computer-based method according to claim 1, where:
    the EECE is an electrical device or an electromechanical device,
    the static data for each EECE include at least one of known condition energy consumption data, status data, frequency of use data, lockout data, environmental sensor data measured proximate to the EECE, and control command data, and the measured performance data for each EECE include at least one of speed data, electrical current data, electrical voltage data, and electrical power data.

12. The computer-based method according to claim 1, where the dynamic data for one or more EECEs have a filtered data rate that is less than a raw data rate of the measured performance data transmitted from the EECE to the BAS or network edge device over a local network.

13. A system comprising a network interface, a memory and a processor, coupled to the network interface and the memory, configured to tag building automation system (BAS) points for a building according to the computer-based method of claim 1.

14. A non-transitory computer-readable medium storing instructions that, when executed by a processor, cause the processor to tag building automation system (BAS) points for a building according to the computer-based method of claim 1.

* * * * *